US012591469B1

(12) United States Patent
Bhat et al.

(10) Patent No.: US 12,591,469 B1
(45) Date of Patent: Mar. 31, 2026

(54) AUTOMATIC PARALLEL EXECUTION CONTROL SYSTEMS AND METHODS FOR ERROR-REDUCING PROCESS DEPLOYMENT

(71) Applicant: Citibank, N.A., New York, NY (US)

(72) Inventors: Ganesh Prasad Bhat, West Orange, NJ (US); James Randolph Myers, Clearwater Beach, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/373,126

(22) Filed: Oct. 29, 2025

(51) Int. Cl.
*G06F 9/52* (2006.01)
*G06F 21/44* (2013.01)

(52) U.S. Cl.
CPC .............. *G06F 9/524* (2013.01); *G06F 21/44* (2013.01)

(58) Field of Classification Search
None
See application file for complete search history.

(56) References Cited

U.S. PATENT DOCUMENTS

| | | | |
|---|---|---|---|
| 2021/0117310 A1* | 4/2021 | Lu .......................... | G06F 11/362 |
| 2022/0156631 A1* | 5/2022 | Kanso ....................... | G06F 8/60 |
| 2022/0413845 A1* | 12/2022 | Mathew ............... | G06F 9/5016 |
| 2023/0336367 A1* | 10/2023 | Panikkar ............... | H04L 9/0894 |

* cited by examiner

*Primary Examiner* — Eric C Wai
(74) *Attorney, Agent, or Firm* — Perkins Coie LLP; Sumedha Ahuja; Aidan Faustina

(57) ABSTRACT

Disclosed herein are systems, methods, and computer-readable media for autonomous transformation decisions and implementations that use controlled parallel execution of both an old process and a new process to enable error-reducing deployment of the new process. In some implementations, input data associated with deployment of a first deterministic process is obtained and provided to a transformation decision engine that produces, as output, a transformation readiness evaluation. In response to determining that the transformation readiness evaluation falls within a predetermined range, an instruction to transform a second deterministic process based on the first deterministic process can be generated that initiates a parallel deployment of the first deterministic process and the second deterministic process. The parallel deployment can result in a replacement of the second deterministic process with the first deterministic process being initiated.

20 Claims, 9 Drawing Sheets

<u>600</u>

600

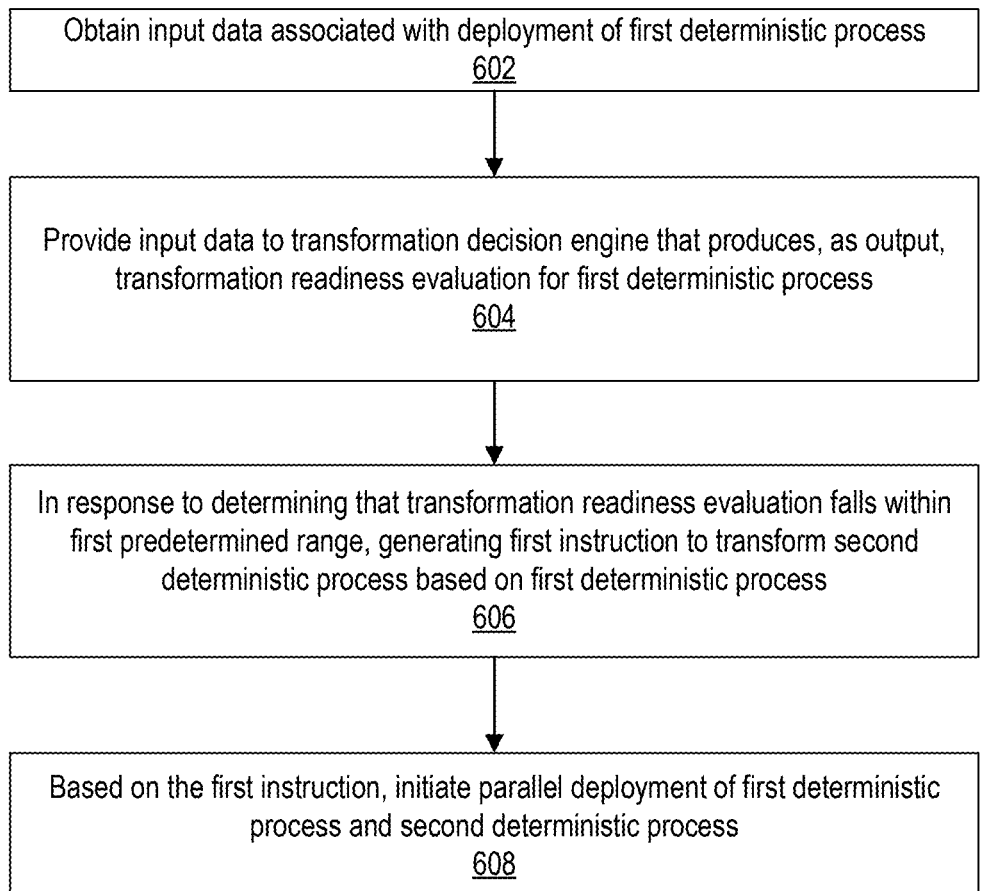

Obtain input data associated with deployment of first deterministic process
602

Provide input data to transformation decision engine that produces, as output, transformation readiness evaluation for first deterministic process
604

In response to determining that transformation readiness evaluation falls within first predetermined range, generating first instruction to transform second deterministic process based on first deterministic process
606

Based on the first instruction, initiate parallel deployment of first deterministic process and second deterministic process
608

*FIG. 6*

AUTOMATIC PARALLEL EXECUTION CONTROL SYSTEMS AND METHODS FOR ERROR-REDUCING PROCESS DEPLOYMENT

BACKGROUND

Process transformation refers to the strategic redesign and optimization of existing business processes to align with evolving organizational goals and market demands. Transformations often involves reengineering workflows, adopting advanced technologies, and integrating data analytics to boost efficiency and agility. Often, the process to be transformed is computer-implemented, in which case transformation can consist of deploying new software to receive incoming data and/or replacing computer hardware components of an existing process to run the new software.

Artificial intelligence (AI) refers to the capability of computational systems to perform tasks typically associated with human intelligence, such as learning, reasoning, problem-solving, perception, and decision-making. Generative artificial intelligence (sometimes called Generative AI or Gen AI) is a subfield of AI that uses generative models to produce text, images, videos, or other forms of data. In recent years, there has been a significant proliferation of software tools that employ AI models, including generative AI models to interpret natural language queries provided as input by a human user and return a natural language response as output.

BRIEF DESCRIPTION OF THE DRAWINGS

Detailed descriptions of implementations of the present invention will be described and explained through the use of the accompanying drawings.

FIG. 6 is a flow diagram illustrating an example method for automatic process deployment via replacement of a second deterministic process with a first deterministic process, in accordance with some implementations of the present technology.

Figure 1:
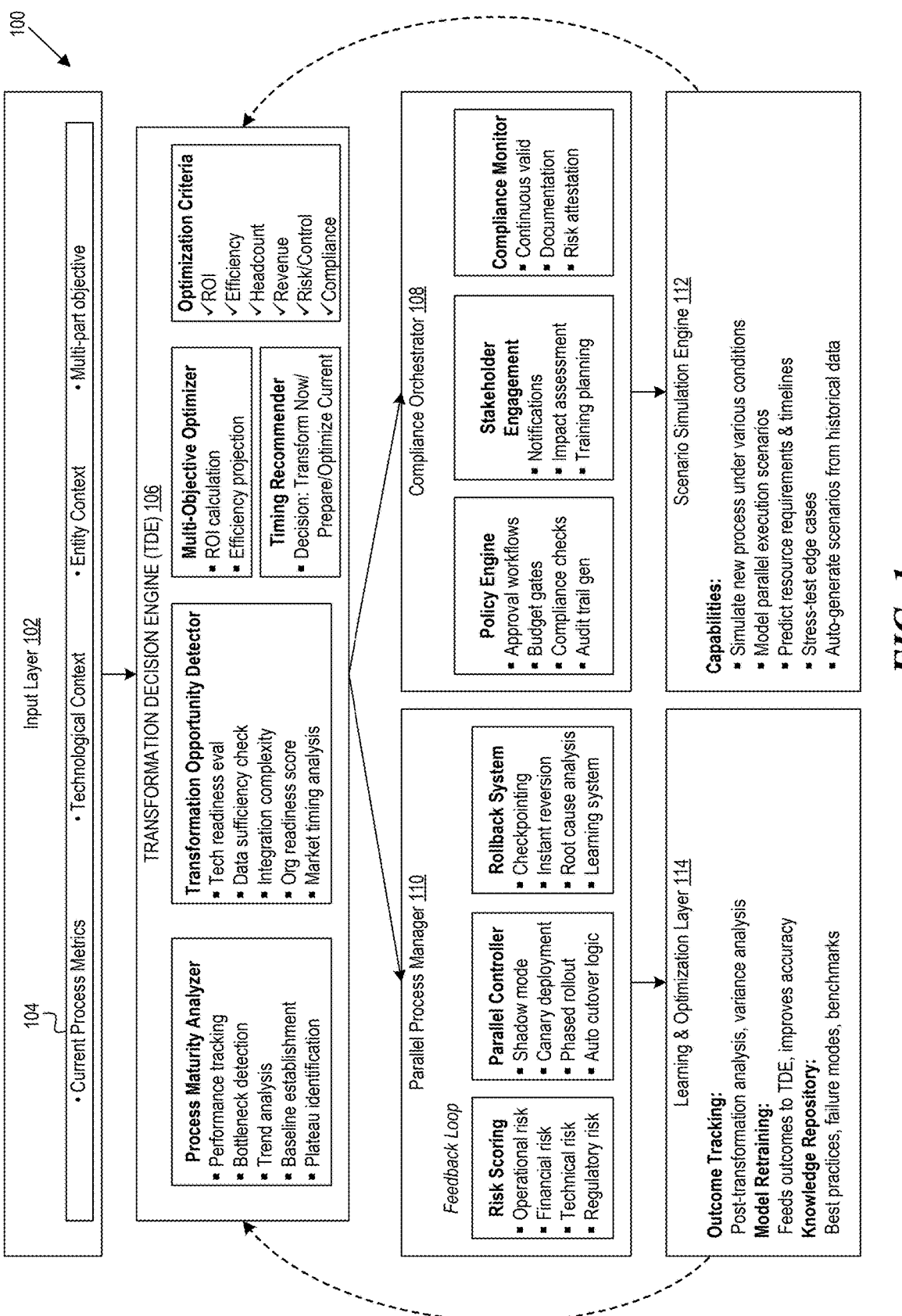
FIG. 1 is an illustration of an example process deployment environment, in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Many systems for process transformation and automation rely on manual decision-making approaches that can lead to poorly timed implementations and increased operational risks. These systems often lack comprehensive frameworks for evaluating when a process is ready for transformation and can fail to integrate multiple factors such as process maturity, technology readiness, organizational capacity, and risk assessment into a unified decision-making framework, leading to suboptimal timing decisions that can result in failed deployments, cost overruns, and operational disruptions. These poorly timed deployments can result in organizations spending significant computational resources on prematurely deploying (or preparing to deploy) new automated processes, only for the prematurity of this decision to later be uncovered and the deployment process to be canceled or reverted.

Additionally, many current process transformation systems lack mechanisms for managing the technically challenging transition period between legacy and new processes. These systems often employ "big bang" deployment approaches where the old process is immediately replaced with the new process simultaneously wherever the old process is used, creating significant operational risk in scenarios where the new process fails or performs poorly. Such approaches can cause significant disruption to automated workflows when errors are present in the new process and can require a significant expenditure of computational resources to remedy these errors across all deployments of the new process. Many systems also lack automated rollback capabilities that store previous versions of a process for re-deployment and/or comprehensive monitoring during the transition phase for early detection of technical deficiencies. Therefore, when new processes are deployed, extended periods of degraded performance and/or service interruptions can occur before an error is detected and computationally expensive reconfigurations of the process can be necessary to remedy the error rather than an automated re-deployment of a previous process.

Furthermore, many existing systems do not incorporate continuous learning mechanisms that can improve transformation decision-making over time. These systems typically operate with static decision criteria and do not capture or analyze outcomes from previous transformations to refine future recommendations. This limitation can prevent automated deployment systems from improving classification of successful transformation patterns over time and can result in repeated mistakes across similar transformation scenarios, reducing the overall effectiveness and efficiency of automated process improvement.

The present technology provides an autonomous transformation decision and implementation system that uses controlled parallel execution of both an old process and a new process to enable error-reducing deployment of the new process. The present technology can include a transformation decision engine that produces a transformation readiness evaluation for a first deterministic process by generating multiple transformation values using one or more AI models. The transformation decision engine calculates the transformation readiness evaluation based on these transformation values and a set of evaluation weights, enabling the system to generate different instructions regarding transformation based on predetermined ranges of the evaluation, including instructions to (1) increment the first deterministic process without performing a transformation, (2) transform a second deterministic process (e.g., a currently deployed process) based on the first deterministic process after a predetermined time period, or (3) transform the second deterministic process based on the first deterministic process without a delayed time period.

The present technology can further include a compliance orchestrator that produces an authorization notification by transmitting transformation notifications to authorization entities identified by a policy engine, receiving responses from the authorization entities, comparing protocols to applicable compliance frameworks, and generating the authorization notification based on the comparison results and responses. Upon authorization, a parallel process manager can initiate a parallel deployment including deploying a simulated version of the first deterministic process to generate performance metrics, initiating shadow deployment alongside the second deterministic process to generate accuracy metrics, and conducting canary deployment where the first deterministic process handles an increasing percentage of production traffic upon satisfaction of evaluation criteria that demonstrate desirable performance of the first deterministic process. Rollback measures can be included for determining deployment failures by comparing performance metrics to error thresholds and can create checkpoints of in-progress signals, redirect traffic to the second deterministic process, and/or record system states to a failure pattern database.

The present technology addresses the limitations of many existing process transformation systems by providing comprehensive frameworks for evaluating transformation readiness that integrate multiple factors including process maturity technology readiness, context associated with a deploying entity, and risk assessment into unified decision-making. Performing these evaluations before initiating deployment increases the likelihood that, when computational processes are initiated to prepare and deploy a process, these resources are likely to result in a successful deployment rather than being wasted on a deployment that will fail or otherwise be abandoned. The automated parallel deployment approach can include the shadow deployment, the canary deployment, and/or phased rollout to reduce the risks of error/failure and unnecessary resource expenditure associated with "big bang" deployment approaches used by many systems, while the continuous learning and optimization layer enables the system to retrain AI models based on performance metrics from completed transformations, enabling more accurate automatic classification of successful transformation patterns over time. The compliance orchestrator with automated audit logging in immutable databases and continuous validation engines improves regulatory compliance throughout the transformation process, while the scenario simulation engine enables comprehensive evaluation of a process before committing to transformations, conserving computational resources from being expended on preparing a process for deployment when that deployment is likely to fail. The rollback measures enable a process to quickly be reverted to a previous version, decreasing the time and computational resources needed to address errors with new deployments.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Example Process Deployment Environment

FIG. 1 is an illustration of an example process deployment environment 100, in accordance with some implementations of the present technology. The process deployment environment 100 includes an input layer 102, input data 104, a transformation decision engine (TDE) 106, a compliance orchestrator 108, a parallel process manager 110, a scenario simulation engine 112, and a learning and optimization layer 114. The process deployment environment 100 can be implemented using components of the example computer system illustrated and described in more detail with reference to FIG. 9. Likewise, implementations of the example process deployment environment 100 can include different and/or additional components or can be connected in different ways.

The process deployment environment 100 can include an input layer 102, which receives input data 104 associated with deployment of a deterministic process and provides (e.g., transmits, communicates) the input data 104 to a TDE 106. A deterministic process is a series of computer-implemented operations or steps that can be executed repeatedly to perform a particular function and are intended to produce a same output whenever executed for a particular input. For example, a deterministic process can be a trade reconciliation process (e.g., in the context of financial services), a claim evaluation process (e.g., in the context of insurance), a customer support ticket resolution process, and the like. Deployment of a deterministic process includes an entity (e.g., an actor such as an individual or organization) adopting/distributing the deterministic process such that at least some production traffic (e.g., input generated by the entity and/or one or more other entities that is to be handled by at least one process of the entity) is handled by the deterministic process.

In some implementations, as depicted in FIG. 1, the input data 104 includes a multi-part objective, a current process metric, technological context, and/or entity context. The multi-part objective can be a description of one or more desired outcomes for deployment of deterministic processes and/or a list of criteria to optimize while deploying deterministic processes. For example, the multi-part objective can include a set of optimization criteria such as return on investment (ROI), computational processing efficiency, generated revenue, and the like. The current process metric can be a numerical measure of performance (e.g., a performance metric) of a process that is currently deployed, such as a cycle time, an error rate, and/or an operational cost for the process. The technological context includes a description of one or more technologies available to the entity for deploying deterministic processes (e.g., available AI capabilities, requirements for integration with other processes). The entity context includes a description of one or more features and/or objectives of the entity itself and/or of a deterministic process, such as a capacity for transforming processes (e.g., a speed at which processes can be modified/replaced, a number of processes that can be modified/replaced), a readiness for stakeholders (e.g., other entities interacting with the entity and/or employees/members of the entity) to interact with a transformed process, a desired business outcome, or a particular cost/benefit of the deterministic process.

After the input data 104 is provided to the TDE 106, the TDE 106 can produce, as output, a transformation readiness evaluation for a first deterministic process. For example, the first deterministic process can be a deterministic process that is specified in the input data 104 and/or another input to the TDE 106 as a process with which to replace and/or modify a second deterministic process that is currently deployed by the entity. In other words, the second deterministic process can be transformed based on the first deterministic process, depending on the transformation readiness evaluation. In some implementations, the TDE 106 produces the transformation readiness evaluation using one or more AI models. Each AI model from the one or more AI models can be a language model or another machine learning algorithm (e.g., as described in relation to FIGS. 7 and 8 below) trained to interpret the input data 104 and generate, as output, a transformation value. A transformation value is a numerical value that is used by the TDE 106 to calculate the overall transformation readiness evaluation.

Figure 2:
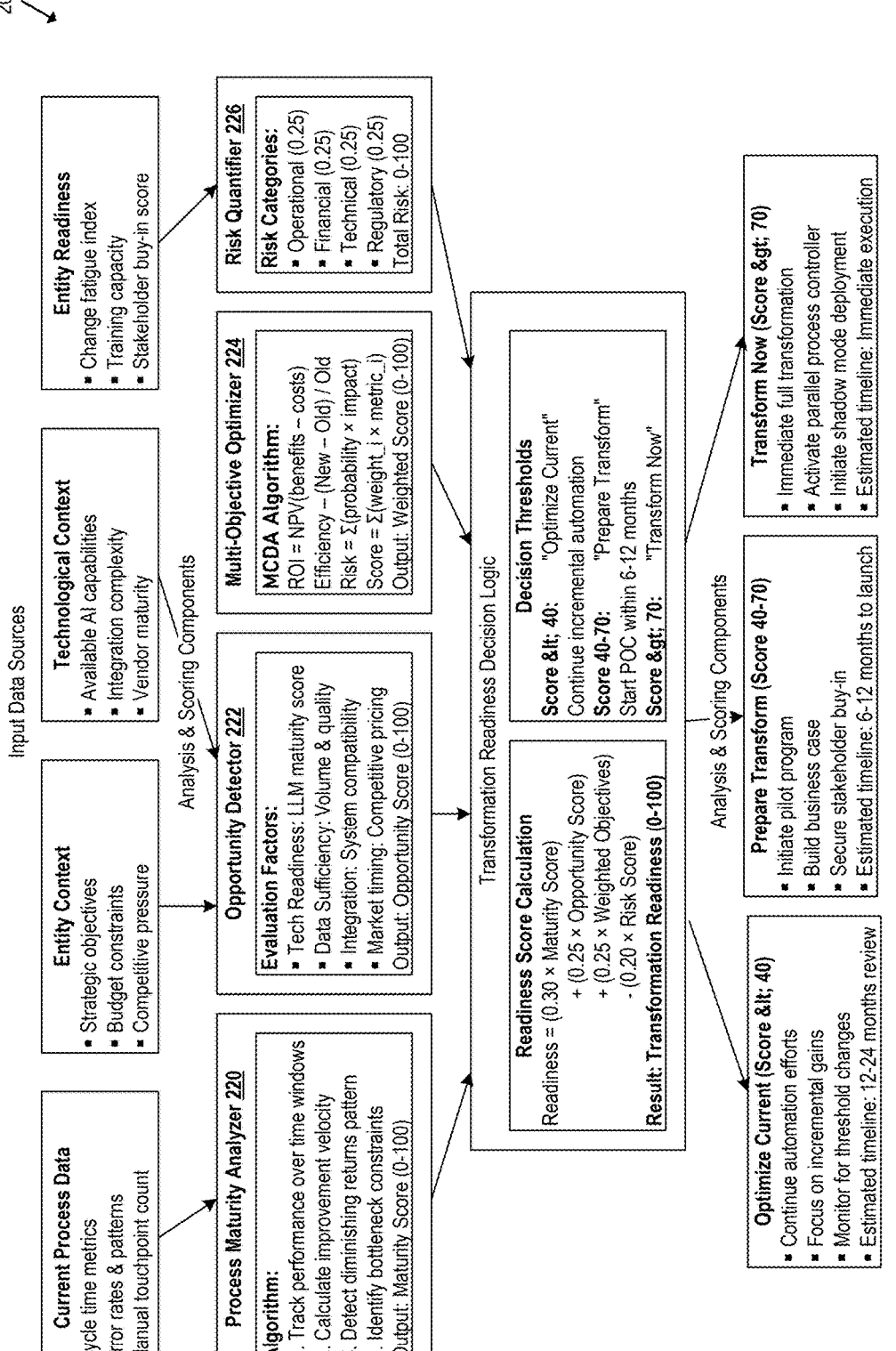
FIG. 2 illustrates an example transformation decision engine that calculates a transformation readiness evaluation using transformation values, in accordance with some implementations of the present technology.

FIG. 2 illustrates an example TDE 206 that calculates a transformation readiness evaluation using transformation values, in accordance with some implementations of the present technology. The TDE 206 can be the same as or generally similar to the TDE 106 described in relation to FIG. 1 above. As depicted, the TDE 206 includes several components for calculating transformation values, which are then used to calculate the transformation readiness evaluation as a numerical score. For example, the TDE 206 can include a process maturity analyzer 220 that generates, using the one or more AI models described above, a first transformation value based on current process data (e.g., a current process metric as described in relation to the input data 104 above). Continuing with the same example, the one or more AI models can identify performance over time, improvement velocity, diminishing return patterns, bottlenecks, and/or the like for a currently deployed process (e.g., the second deterministic process) based on the current process data and responsively generate a value between 0 and 100 representing the maturity of the currently deployed process, with larger values representing greater maturity (e.g., a higher likelihood that the process has reached the limits of incremental improvement and is ready for transformation based on another process). As a particular illustration, the one or more AI models can generate a higher first transformation value for a process showing consistently diminishing marginal returns from automation investments (e.g., each additional automated step providing less benefit than the previous step) than for a process still achieving linear or accelerating improvements.

As another example, the TDE 206 can include an opportunity detector 222 that generates, using the one or more AI models described above, a second transformation value based on technological context and/or entity context (e.g., the technological context and the entity context as described in relation to the input data 104 above). Continuing with the same example, the one or more AI models can identify a maturity of the AI capabilities available to the entity, a sufficiency of the data accessible by the entity, compatibility requirements for systems/processes operated by the entity, and/or a market position occupied by the entity relative to its competitors based on the technological context and/or the entity context. The one or more AI models can then responsively generate a value between 0 and 100 representing a readiness for the entity to transform a currently deployed process (e.g., the second deterministic process) at a present time, with larger values representing that the present time is more opportune for a transformation (e.g., due to high availability of pre-trained models and/or high quality model training data, existence of proven deployment patterns, and the like).

As a third example, the TDE 206 can include a multi-objective optimizer 224 that generates, using the one or more AI models described above, a third transformation value based on the entity context and/or the multi-part objective. Continuing with the same example, the one or more AI models can (1) model costs of deploying the first deterministic process (e.g., implementation costs such as software licenses, professional services, internal labor, operational costs such as cloud computing costs, risk costs such as potential process downtime and error correction costs) and/or corresponding benefits of deployment based on the entity context to generate an ROI score, (2) generate an efficiency score representing a likely efficiency gain when replacing a currently deployed process (e.g., the second deterministic process) with the first deterministic process, and/or (3) generate a risk reduction score representing a likely risk reduction when replacing the currently deployed process with the first deterministic process. Again continuing with this example, the multi-objective optimizer can then calculate the third transformation value as a weighted composite of the scores described above between 0 and 100, with larger values representing greater extents to which the multi-part objective can be satisfied. In some implementations, the weights used to calculate the third transformation value are configurable and can be adjusted based on reasons for transforming a deployed process. For example, a cost-focused transformation might weight ROI at 50%, efficiency at 30%, and risk reduction at 20%, while a growth-focused transformation might weight revenue generation at 40%, efficiency at 30%, and ROI at 30%. The multi-objective optimizer 224 can also support constraint-based optimization where certain of the scores described above must meet minimum thresholds regardless of the overall weighted composite of the scores.

As a fourth example, the TDE 206 can include a risk quantifier 226 that generates, using the one or more AI models described above, a fourth transformation value based on the multi-part objective. Continuing with the same example, the one or more AI models can identify a list of risks (e.g., operational, financial, technical, regulatory) associated with deploying the first deterministic process and responsively generate a value between 0 and 100 representing a severity of those risks, with larger values representing higher severity (e.g., greater likelihood of risk-based costs).

As depicted, the TDE 206 calculates the transformation readiness evaluation based on the first transformation value, the second transformation value, the third transformation value, and the fourth transformation value as described above, in addition to a set of evaluation weights. Each evaluation weight in the set of evaluation weights is used as a coefficient for a particular transformation value, and the four transformation values are multiplied by those coefficients and added together to generate a final value between 0 and 100 that is the transformation readiness evaluation, with larger values representing greater readiness for transformation. Although the set of evaluation weights is depicted as having a coefficient of 0.3 for the first transformation value generated by the process maturity analyzer 220, a coefficient of 0.25 for the second transformation value generated by the opportunity detector 222, a coefficient of 0.25 for the third transformation value generated by the multi-objective optimizer 224, and a coefficient of –0.2 for the fourth transformation value generated by the risk quantifier 226, these coefficients are purely illustrative and other coefficients can be used. Additionally, in some implementations, more, fewer, and/or different values can be included in the transformation values used to calculate the transformation readiness evaluation, and/or different operations other than addition of the transformation values can be used. Combining multiple transformation values generated using different inputs enables the transformation readiness evaluation to more accurately represent the appropriateness of performing a transformation than other techniques, as transformation readiness is thereby predicted based on multiple relevant dimensions rather than just one.

Depending on the value calculated for the transformation readiness evaluation by the TDE 206, different instructions for proceeding with a potential transformation can be generated by the TDE 206 itself or another component of a process deployment environment (e.g., the process deployment environment 100). For example, in response to determining that the transformation readiness evaluation falls within a first predetermined range of relatively low possible values (e.g., 0-40), indicating that performing a transformation based on the first deterministic process would likely not be well-timed, a first instruction can be generated to increment (e.g., make gradual adjustments/improvements to, continue to monitor the performance of, and/or otherwise additionally prepare for deployment) the first deterministic process before initiating a transformation based on the first deterministic process. As another example, in response to determining that the transformation readiness evaluation falls within a second predetermined range of middling values (e.g., 40-70), indicating that the first deterministic process is a viable candidate for transformation but would benefit from some additional modifications/monitoring beforehand, a second instruction can be generated to transform a second deterministic process based on the first deterministic process after a predetermined time period (e.g., one month, six months, twelve months) has elapsed. Waiting until the predetermined time period has elapsed enables the entity seeking to deploy the first deterministic process to more thoroughly evaluate the pros and cons of doing so, build up supporting infrastructure for the deployment, notify relevant stakeholders, and the like before deployment begins. As a third example, in response to determining that the transformation readiness evaluation falls within a third predetermined range of high values (e.g., 70-100), indicating that the first deterministic process is a strong candidate for transformation and therefore that transformation can begin immediately or shortly after (e.g., within one month) of calculating the transformation readiness evaluation, a third instruction can be generated to transform the currently deployed second deterministic process based on the first deterministic process. The third instruction can include a set of protocols (e.g., steps that can be implemented on a computer system used for deployment) for transforming the second deterministic process that is followed by other components of the process deployment environment to enact the transformation. Generating different instructions based on different values of the transformation readiness evaluation helps transformations to be performed with appropriate timing, resulting in reduced errors and higher overall performance when deployment of the first deterministic process does occur.

Referring again to FIG. 1, based on the transformation readiness evaluation calculated by the TDE 106, an instruction can be provided to one or both of a compliance orchestrator 108 and a parallel process manager 110. In some implementations, the instruction is only provided when it is a third instruction as described in relation to FIG. 2 above. Such implementations not only enable higher-performance deployments of the first deterministic process, as described above, but also conserve computational resources, as the compliance orchestrator 108 and parallel process manager 110 are not activated until they can execute a transformation that is likely to be desirable to the deploying entity and result in high performance, saving resources that would otherwise be spent on initiating transformations that are likely to be canceled or otherwise fail.

Figure 3:
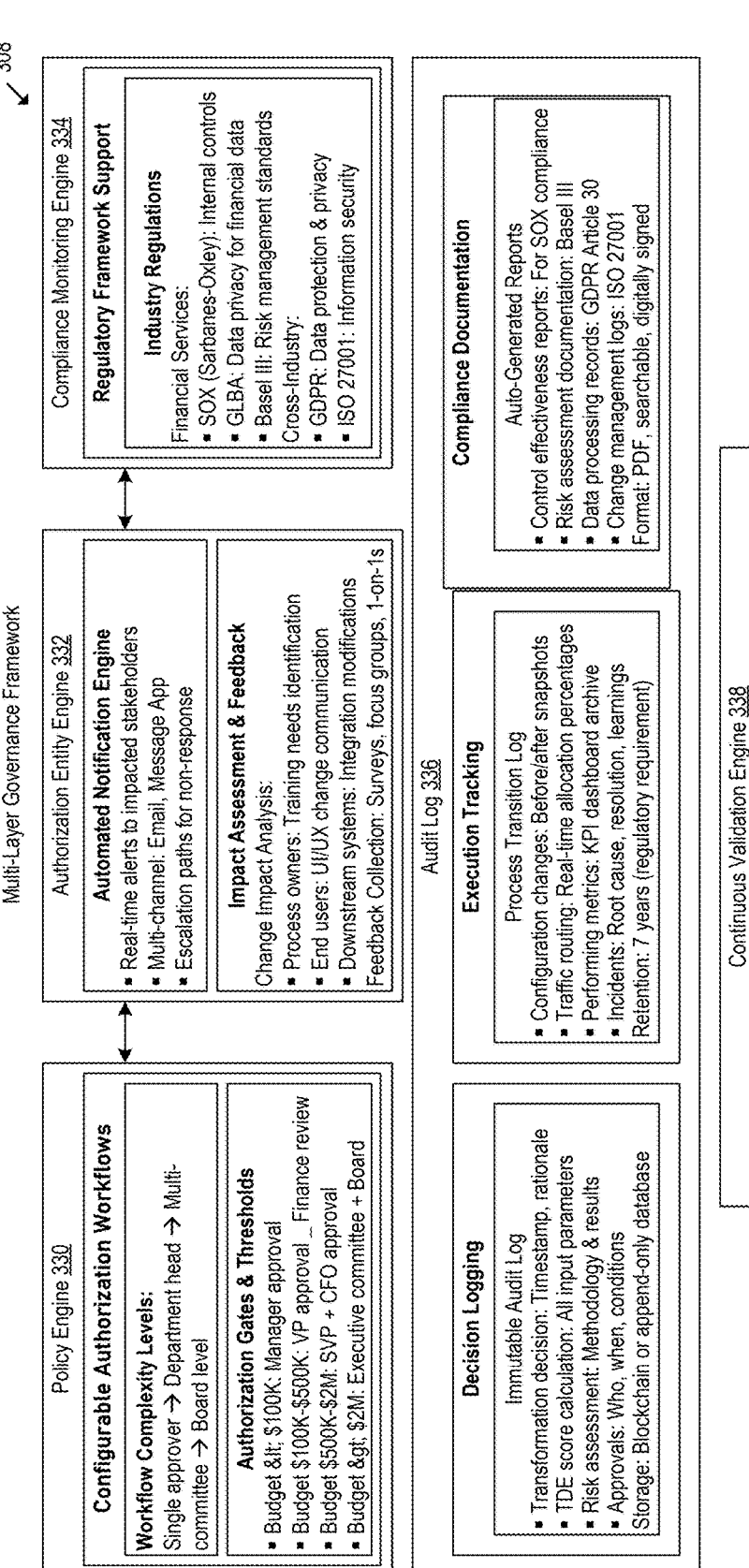
FIG. 3 illustrates an example compliance orchestrator that receives an instruction as input and produces, as output, an authorization notification, in accordance with some implementations of the present technology.

FIG. 3 illustrates an example compliance orchestrator 308 that receives the third instruction as input and produces, as output, an authorization notification, in accordance with some implementations of the present technology. The compliance orchestrator 308 can be the same as or generally similar to the compliance orchestrator 108 described in relation to FIG. 1 above. The authorization notification is a notification indicating whether the third instruction is accepted, thereby signaling whether or not the second deterministic process will be transformed based on the first deterministic process. In some implementations, the compliance orchestrator 308 generates the authorization notification using a policy engine 330, an authorization entity engine 332, and a compliance monitoring engine 334. The policy engine 330 determines a policy of the entity with respect to authorizing deployment of the first deterministic process based on one or more characteristics of that process. For example, the entity can apply various policies based on one or more protocols in the set of protocols, the overall complexity of the first deterministic process, the budget allocated to the first deterministic process, a risk level associated with the first deterministic process, and/or other factors. Continuing with the same example, the policy engine 330 can identify/determine one or more authorization entities (e.g., entities employed by or otherwise affiliated with the entity that have authorization authority for at least one deterministic process) that, according to the relevant policy, must authorize deployment of the first deterministic process before the third instruction is accepted.

In some implementations, the one or more authorization entities determined by the policy engine 330 are contacted via the authorization entity engine 332 in order to receive a response from each of these authorization entities indicating whether the entity authorizes deployment of the first deterministic process. For example, the authorization entity engine 332 can automatically transmit a transformation notification (e.g., an email or other message in natural language) to the one or more authorization entities and receive a set of responses to that notification from the one or more authorization entities. In some implementations, the authorization entity engine 332 can include an escalation path that sends one or more additional notifications to entities from the one or more authorization entities that have not responded to the transformation notification after a predetermined period of time, improving the likelihood that the compliance orchestrator 308 can make a timely authorization determination. In these and other implementations, the authorization entity engine 332 can generate an impact assessment associated with replacing the second deterministic process with the first deterministic process. For example, the impact assessment can describe, in natural language, one or more predicted effects of performing this replacement and can be generated by one or more AI models (e.g., the one or more AI models described above). The impact assessment can be included in the transformation notification, thereby providing the one or more authorization entities with relevant information for deciding whether to provide authorization.

In some implementations, a compliance monitoring engine 334 determines (e.g., using one or more AI models) a set of applicable compliance frameworks (e.g., regulatory frameworks relevant to deployment of the first deterministic process) based on the industry that the first deterministic process will be deployed within, the legal jurisdiction(s) in which the first deterministic process will be deployed, and/or other factors that determine which regulatory frameworks govern the usage of a process. For example, when the relevant industry is financial services, regulatory frameworks such as the Sarbanes-Oxley Act and Gramm-Leach-Bliley Act can be included in the set of applicable compliance frameworks. The compliance monitoring engine 334 can then compare the set of protocols included in the third instruction to the set of applicable compliance frameworks to determine whether deployment of the first deterministic process would comply with the applicable frameworks. For example, this comparison can be an evaluation (e.g., performed by one or more AI models that interpret semantic meanings) of whether performance of a protocol from the set of protocols would violate one or more requirements of the frameworks in the set of applicable compliance frameworks. The compliance monitoring engine 334 can then generate an authorization notification based on a result of the comparison and the set of responses received from the one or more authorization entities. For example, the authorization notification can be generated to indicate that the third instruction is accepted in response to (1) the result of the comparison indicating compliance with each framework in the set of applicable compliance frameworks and (2) the set of responses including a majority of authorizations, as, in this example, the first deterministic process is likely to both comply with applicable regulations and be acceptable to relevant stakeholders associated with the entity. In other implementations, the set of responses includes an authorization from a particular subset or number of entities from the one or more authorization entities that is designated within the compliance orchestrator 308 as sufficient for approval, regardless of whether that subset/number represents a majority of the one or more authorization entities.

Figure 4:
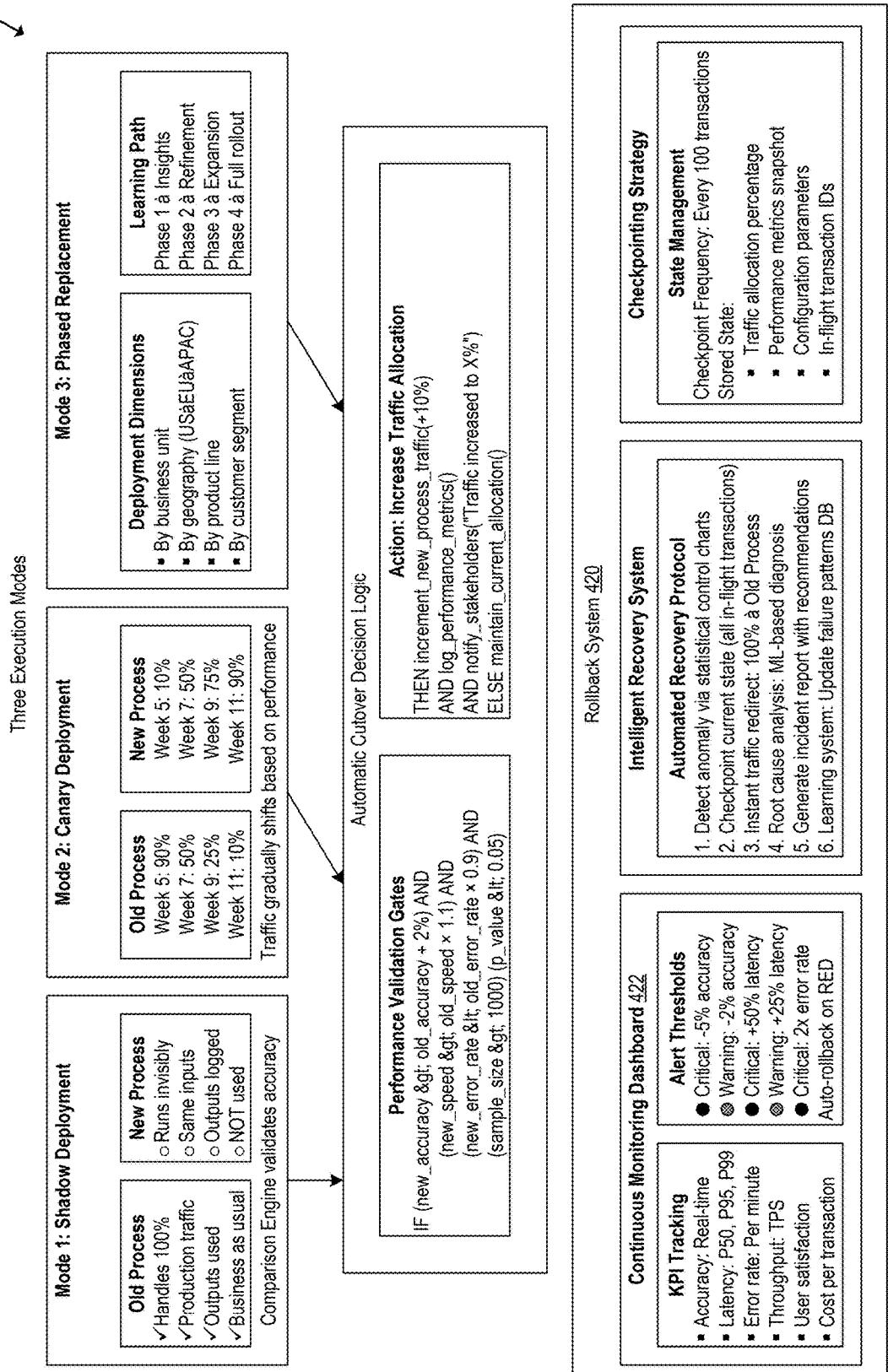
FIG. 4 illustrates an example parallel process manager that initiates a parallel deployment of the first deterministic process and the second deterministic process, in accordance with some implementations of the present technology.

FIG. 4 illustrates an example parallel process manager 410 that initiates a parallel deployment of the first deterministic process and the second deterministic process, in accordance with some implementations of the present technology. The parallel process manager 410 can be the same as or generally similar to the parallel process manager 110 described in relation to FIG. 1 above. A parallel deployment is a deployment of multiple processes in which each process handles at least some portion of production traffic intended as input for a particular type of process including the multiple processes. In some implementations, the parallel process manager 410 initiates the parallel deployment in response to an authorization notification indicating the third instruction is accepted (e.g., the authorization notification described in relation to FIG. 3). Initiating the parallel deployment in response to an authorization notification conserves computational resources, as the resources of the parallel process manager 410 are not activated unless deployment of a process has already been authorized, preventing resources from being spent deploying unauthorized processes that would have to be rolled back or otherwise modified.

As depicted, the parallel process manager 410 can deploy the first deterministic process in one or more of three distinct modes. The first mode includes initiating a shadow deployment of the first deterministic process alongside the second deterministic process to generate an accuracy metric for the first deterministic process. A shadow deployment is a deployment in which the first deterministic process receives production traffic that is being handled simultaneously by the second deterministic process. In the shadow deployment, only the output of the second deterministic process is used further by the entity and/or other entities for purposes other than process testing and the outputs of the first deterministic process are used to evaluate the performance of the deterministic process. For example, the outputs of the first deterministic process can be compared to the outputs of the second deterministic process as a control to generate an accuracy metric for the first deterministic process representing the accuracy of the outputs of the first deterministic process.

In some implementations, before deploying the shadow deployment as described above, a simulated version of the first deterministic process is subjected to one or more stress testing conditions. The simulated version is a copy of the first deterministic process (e.g., performs the same functions in a same manner) or is the first deterministic process itself but receives historical data (e.g., data from past usages of a different process) rather than production traffic as input. Providing the historical data enables the first deterministic process to be subjected to one or more stress testing conditions (e.g., conditions of abnormal transaction volume, upstream system latency, data quality, and the like) by providing particular historical data that is abnormal in comparison to typical production traffic. The outputs of the simulated version of the first deterministic process can be compared to predefined values for expected performance under the stress testing conditions and/or outputs of the second deterministic process under similar conditions as a control to generate a performance metric representing the ability of the first deterministic process to handle abnormal traffic conditions.

The second mode of the parallel process manager 410 is a canary deployment mode. In this mode, in response to the accuracy metric described above exceeding a predetermined threshold, thereby indicating that the first deterministic process generates accurate outputs, a canary deployment of the first deterministic process is initiated. A canary deployment is a deployment in which a previously deployed process and a newly deployed process share production traffic, with the percentage of the traffic allocated to each process gradually shifting based on performance of the processes. In the case of a canary deployment of the first deterministic process while the second deterministic process is active, the first deterministic process handles a percentage of production traffic for the second deterministic process, which increases upon satisfaction of a set of evaluation criteria. The set of evaluation criteria includes one or more performance metrics related to the performance of the first deterministic process in relation to the second deterministic process (e.g., relative accuracy, relative latency, relative error rate, relative number of critical incidents), and satisfaction of the criteria can include meeting a predetermined threshold for relatively higher performance (e.g., 5% improved performance, 10% improved performance, 25% improved performance) of the first deterministic process in comparison to the second deterministic process for all or a subset of the set of evaluation criteria. In some implementations, satisfaction of the set of evaluation criteria can require that the predetermined threshold or thresholds that must be met are met or exceeded for at least a predetermined observation period (e.g., a period of time such as 24-72 hours).

In implementations where the first deterministic process repeatedly satisfies the set of evaluation criteria, the percentage of the production traffic allocated to the first deterministic process will eventually reach 100%. In such implementations, upon the first deterministic process handling all the production traffic, the third mode of the parallel process manager 410 can be activated in which a replacement of the second deterministic process with the first deterministic process is initiated. As depicted in FIG. 4, the replacement is a phased replacement in which the second deterministic process is not replaced in all use cases (e.g., all business units, geographies, product lines, and/or customer segments) at once but is sequentially replaced within one or multiple of these use cases at a time until the second deterministic process is completely replaced with the first deterministic process. This phased replacement technique enables learning from each phase of the transformation to help improve efficiency of subsequent stages of the phased replacement.

In some implementations, the parallel process manager 410 includes a rollback system 420 that enables recovery of a previous deployment state when performance of the first deterministic process degrades. For example, the rollback system 420 can compare at least one metric from the set of performance metrics to at least one threshold from a set of error thresholds that represent performance deviations indicative of an error in deployment of the first deterministic process (e.g., 5% accuracy drop, 50% latency increase, double the error rate). Continuing with this example, when the comparison reveals that one or more thresholds from the set of error thresholds has been met or exceeded, the rollback system 420 can determine that a failure in deployment of the first deterministic process has occurred. Based on this determination, the rollback system can then create a checkpoint (e.g., a digital record that remains saved during/after a change in a process) of an in-progress signal from the production traffic (e.g., an input included in the production traffic that has not been fully processed) and then redirect all the production traffic to the second deterministic process. This rollback procedure enables the second deterministic process to be reactivated in light of the failure of the first deterministic process without dropping production traffic that is being processed when the rollback begins, enabling increased reliability of production traffic processing. Additionally or alternatively, the rollback system 420 can record checkpoints capturing in-progress signals and/or other data such as traffic allocation percentages, configuration parameters, performance metrics, and system state (e.g., overall state snapshot of the computer system hosting the first deterministic process or otherwise associated with the first deterministic process). In some implementations, in response to the determination of a failure, a system state associated with the first deterministic process can be recorded to a failure pattern database. Recording the system state present during a failure enables reasons for failure to be analyzed and for future instances of a same or similar system state to be detected, enabling failures to be identified and addressed more rapidly.

In some implementations, the rollback system 420 includes a continuous monitoring dashboard 422, which is a graphical user interface (GUI) that displays one or more alerts related to rollbacks of the deployment of the first deterministic process, enabling the entity and/or other entities to become aware of upcoming or in-progress rollbacks. Additionally or alternatively, the continuous monitoring dashboard 422 can display one or more performance metrics associated with the first deterministic process and/or the second deterministic process.

Returning to FIG. 3, the compliance orchestrator 308 can perform various functions after transformation is complete and the first deterministic process has replaced the second deterministic process. In some implementations, the compliance orchestrator 308 records (e.g., stores, saves) an audit log 336 that documents activities associated with transformation of the second deterministic process based on the first deterministic process. For example, as depicted in FIG. 3, the audit log 336 can include decision logging that indicates whether a transformation was accepted and the basis for this acceptance, execution tracking including metrics relating to deployment (e.g., parallel deployment of the first deterministic process and the second deterministic process, as described in more detail below), and/or compliance documentation including one or more automatically generated reports that are required by a framework from the set of applicable compliance frameworks. For example, the compliance orchestrator 308 can determine, based on the set of applicable compliance frameworks, one or more compliance records to generate. These compliance records can be records that are required for compliance with one or more frameworks from the set of applicable compliance frameworks. In some implementations, the one or more compliance records are then automatically generated and include a timestamp and a digital signature (e.g., a cryptographic key), enabling the authenticity of the records to be verified and decreasing the manual burden of compliance with applicable regulations.

In some implementations, the audit log 336 includes the authorization notification, the set of performance metrics, and a timestamp indicating a date and/or time at which the authorization notification and set of performance metrics are documented. This combination of information enables the audit log 336 to document the time at which authorization of a particular deployment occurred and the performance of that deployment such that the transformation including the particular deployment can be analyzed by the entity and/or third-party regulators. In such implementations, the audit log 336 can be recorded in an immutable database, which is a combination of hardware and/or software for storing data in which entries of data cannot be modified after initially being entered. For example, the immutable database can be a blockchain or an append-only database, both of which enable new data to be added but are tamper-proof or highly tamper-evident with respect to existing data. Thus, usage of the immutable database improves security of the data stored within the compliance orchestrator 308 and improves ease of demonstrating regulatory compliance, as an immutable record is kept that can be used to verify the actions of the entity with respect to the particular deployment.

To further provide automatic support for regulatory compliance, the compliance orchestrator 308 can include a continuous validation engine 338 and an executive governance dashboard 340. The continuous validation engine 338 can perform continuous monitoring of the first deterministic process after deployment to verify whether the process remains compliant with the set of applicable compliance frameworks. For example, where the set of applicable compliance frameworks requires particular controls to execute at particular times, certain approved processes to be followed, certain data quality standards to be met, and/or the like, the continuous validation engine 338 can generate an alert when one or more of these requirements is not met at a particular point during the deployment of the first deterministic process. The executive governance dashboard 340 is a GUI that is populated by the compliance orchestrator 308 and can display a status of the transformation (e.g., a percentage of production traffic allocated to the first deterministic process, a phase of replacement, an alert generated by the continuous validation engine 338), other risk/compliance-related information, and/or metrics associated with the first deterministic process, enabling the entity and/or other entities to readily view and track information related to the transformation.

Returning to FIG. 1, the process deployment environment 100 can include a scenario simulation engine 112 that simulates deployment of processes under various conditions. For example, the scenario simulation engine 112 can deploy a simulated version of the first deterministic process as described in relation to FIG. 4 above and/or model parallel execution scenarios by simulating parallel deployment of the first deterministic process and the separate deterministic process. A simulated parallel deployment can be the same as or generally similar to the parallel deployment described in relation to FIG. 4 above, except that the first deterministic process and the separate deterministic process are provided historical data as input instead of production traffic. The scenario simulation engine 112 enables the capabilities of the first deterministic process to be tested without disrupting the processing of production traffic, enabling more reliable production traffic processing.

The process deployment environment 100 can also include a learning and optimization layer 114 that enables retraining of the one or more AI models used throughout the process deployment environment. For example, after completing the replacement of the second deterministic process with the first deterministic process, the one or more AI models can be retrained by the learning and optimization layer 114, based on a set of performance metrics associated with the first deterministic process, to identify patterns between transformations, transformation evaluations, and evaluation weights. Thus, the ability of the one or more AI models to generate transformation evaluations and/or evaluation weights that accurately represent the readiness of a particular transformation can be improved over time, increasing the effectiveness of future deployments. Further details on model retraining are provided in relation to FIG. 5 below.

Figure 5:
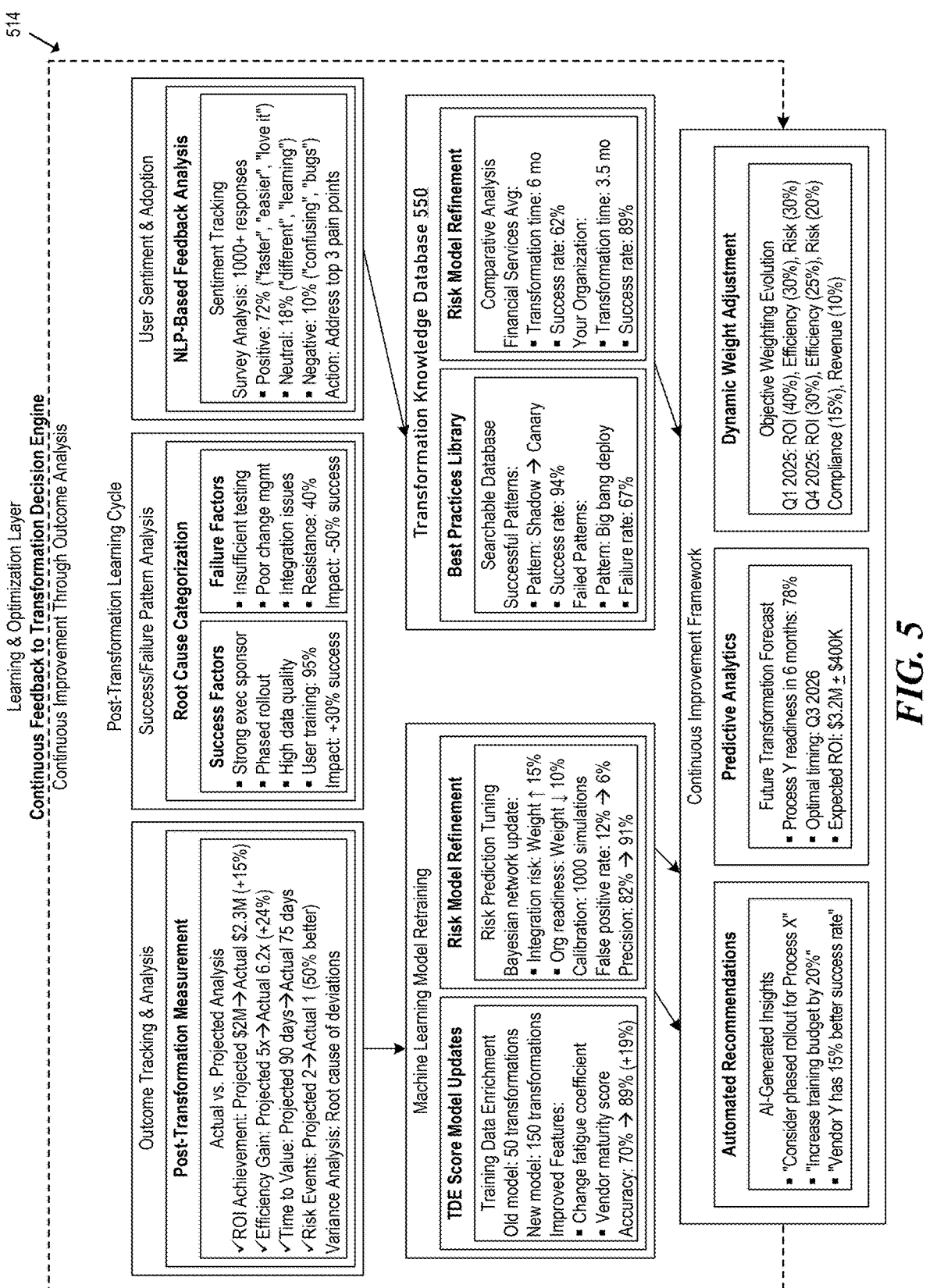
FIG. 5 illustrates an example learning and optimization layer that initiates a parallel deployment of the first deterministic process and the second deterministic process, in accordance with some implementations of the present technology.

FIG. 5 illustrates an example learning and optimization layer 514 that initiates a parallel deployment of the first deterministic process and the second deterministic process, in accordance with some implementations of the present technology. The learning and optimization layer 514 can be the same as or generally similar to the learning and optimization layer 114 described in relation to FIG. 1 above. After completing the replacement of the second deterministic process with the first deterministic process, the learning and optimization layer 514 can determine a set of performance metrics associated with the first deterministic process that represent various dimensions of the process's performance upon deployment (e.g., ROI, efficiency gain over the second deterministic process, number of high-risk events and/or critical failures occurred, headcount impacts for the entity, satisfaction of users of the first deterministic process). Additionally or alternatively, the set of performance metrics can include one or more variances, which are differences between projected and actual outcomes for performance of the first deterministic process's when deployed.

The learning and optimization layer 514 can also perform success and failure pattern analysis, in which one or more AI models are used to identify common characteristics of successful and failed transformations, with "success" being determined based on meeting or exceeding a predetermined thresholds for particular performance metrics, accuracy metrics, and/or the like. For example, classification models from among the one or more AI models can be trained (e.g., as described in relation to FIGS. 7 and 8 below) using attributes of a transformation (e.g., process type, technologies used, implementation approach) as features and a success/failure determination and/or a metric underlying that determination as a label. Thus, the learning and optimization layer 514 can become increasingly accurate at identifying patterns between attributes and success/failure likelihood over time.

Additionally or alternatively, the one or more AI models can be used to determine a sentiment associated with the first deterministic process. A sentiment is a general indication of the quality of experience of interacting with the deterministic process (e.g., "positive," "neutral," "negative"), and the one or more AI models can receive, as input feedback, survey responses and/or other communications about the first deterministic process from users of the first deterministic process. The one or more AI models can then process the input to detect indications of the sentiment of those users toward the first deterministic process. In some implementations, a transformation knowledge database 550 can be updated based on the determined sentiment. The transformation knowledge database 550 is a database including one or more comparisons of transformations of different types (e.g., transformations involving different process or deployment types) across one or more performance metrics, thereby enabling the relative effectiveness of transformations of different types for achieving particular performance metrics to be evaluated. Updating the transformation knowledge database 550 can cause the transformation knowledge database 550 to reflect the sentiment by updating the success rate of a particular type of transformation (e.g., negative sentiment for processes deployed using a first type of transformation lowers the success rate for the first type, positive sentiment for processes deployed using a second type of transformation raises the success rate for the second type). The learning and optimization layer 514 can then retrain, based on data from the transformation knowledge database 550, the one or more AI models, thereby enabling the one or more AI models to better identify patterns between transformation types and success rates.

In some implementations, the learning and optimization layer 514 extracts, using natural language processing (e.g., performed by the one or more AI models), common themes in feedback provided by users about various processes and, based on these themes, identifies a set of best practices that result in positively reviewed processes. One or more of these best practices can then be automatically provided (e.g., to the entity and/or another entity) as a recommendation for future processes or a prediction for an expected optimal timing for a future transformation.

Example Method Flow

FIG. 6 is a flow diagram illustrating an example method 600 for automatic process deployment via replacement of a second deterministic process with a first deterministic process, in accordance with some implementations of the present technology. In some embodiments, the method 600 is performed by components of the example computer system illustrated and described in more detail in relation to FIG. 9 below and/or the process deployment environment 100 described in relation to FIG. 1 above. Likewise, embodiments can include different and/or additional operations or can perform the operations in different orders.

In operation 602, input data associated with deployment of a first deterministic process is obtained. The input data can be the same as or generally similar to the input data 104 as described in relation to FIG. 1 above and can include at least a multi-part objective, a current process metric, technological context, and entity context. The first deterministic process can be the same as or generally similar to the first deterministic process described in relation to FIGS. 1-5 above.

In operation 604, the input data is provided to a TDE that produces, as output, a transformation readiness evaluation for the first deterministic process. The TDE can be the same as or generally similar to the TDE 106 as described in relation to FIG. 1 above. The transformation readiness evaluation can be the same as or generally similar to the transformation readiness evaluation described in relation to FIGS. 1-2 above. In some implementations, the TDE generates the transformation readiness evaluation by generating, using one or more AI models, a first transformation value based on the current process metric; generating, using the one or more AI models, a second transformation value based on the technological context and the entity context; generating, using the one or more AI models, a third transformation value based on the entity context and the multi-part objective; generating, using the one or more AI models, a fourth transformation value based on the multi-part objective; and calculating the transformation readiness evaluation based on the first transformation value, the second transformation value, the third transformation value, the fourth transformation value, and a set of evaluation weights.

In operation 606, in response to determining that the transformation readiness evaluation falls within a first predetermined range, a first instruction is generated to transform a second deterministic process based on the first deterministic process. The first instruction can include a set of protocols for transforming the second deterministic process. The second deterministic process can be the same as or generally similar to the second deterministic process described in relation to FIGS. 1-5 above. The set of protocols can be the same as or generally similar to the set of protocols described in relation to FIGS. 1-5 above. In some implementations, in response to determining that the transformation readiness evaluation falls within a second predetermined range, a second instruction is generated to increment the deterministic process before initiating a transformation based on the first deterministic process. In other implementations, in response to determining that the transformation readiness evaluation falls within a third predetermined range, a third instruction is generated to transform a second deterministic process based on the first deterministic process after a predetermined time period has elapsed.

In operation 608, based on the first instruction, a parallel deployment of the first deterministic process and the second deterministic process is initiated. The parallel deployment can be the same as or generally similar to the parallel deployment described in relation to FIG. 4 above. For example, the parallel deployment can include initiating a shadow deployment of the first deterministic process alongside the second deterministic process to generate an accuracy metric for the first deterministic process, in response to the accuracy metric exceeding a predetermined threshold, initiating a canary deployment of the first deterministic process, and, upon the first deterministic process handling all of the production traffic, initiating a replacement of the second deterministic process with the first deterministic process.

In some implementations, the first instruction is provided, as input, to a compliance orchestrator that produces, as output, an authorization notification indicating whether to accept the first instruction, and in response to the authorization notification indicating the first instruction is accepted, the parallel deployment of the first deterministic process and the second deterministic process is initiated. The compliance orchestrator can produce the authorization notification by transmitting a transformation notification to one or more authorization entities (e.g., as identified by a policy engine), receiving a set of responses from the one or more authorization entities, comparing the set of protocols to a set of applicable compliance frameworks, and generating the authorization notification based on a result of the comparing and the set of responses.

In some implementations, after completing the replacement of the second deterministic process with the first deterministic process during the parallel deployment, the one or more AI models are retrained, based on a set of performance metrics associated with the first deterministic process, to identify patterns between transformations, transformation values, and evaluation weights. In these and other implementations, after completing the replacement of the second deterministic process with the first deterministic process, a set of performance metrics associated with the first deterministic process is determined, and based on comparing at least one metric from the set of performance metrics to at least one threshold from a set of error thresholds, a failure in deployment of the first deterministic process is determined, and based on the determination, a checkpoint of an in-progress signal from the production traffic is created, all the production traffic is redirected to the second deterministic process, and a state of the system is recorded to a failure pattern database. Additionally, a sentiment associated with the first deterministic process may be determined using one or more AI models and, based on the sentiment, a transformation knowledge database is updated, wherein the transformation knowledge database includes one or more comparisons of transformations having different types.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term "DNN" may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), may represent a subject domain (e.g., scientific papers), and/or may encompass another domain or domains, be they larger or smaller than a single language or subject domain. For example, a relatively large, multilingual, and non-subject-specific corpus may be created by extracting text from online web pages and/or publicly available social media posts. Training data may be annotated with ground truth labels (e.g., each data entry in the training dataset may be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 7:
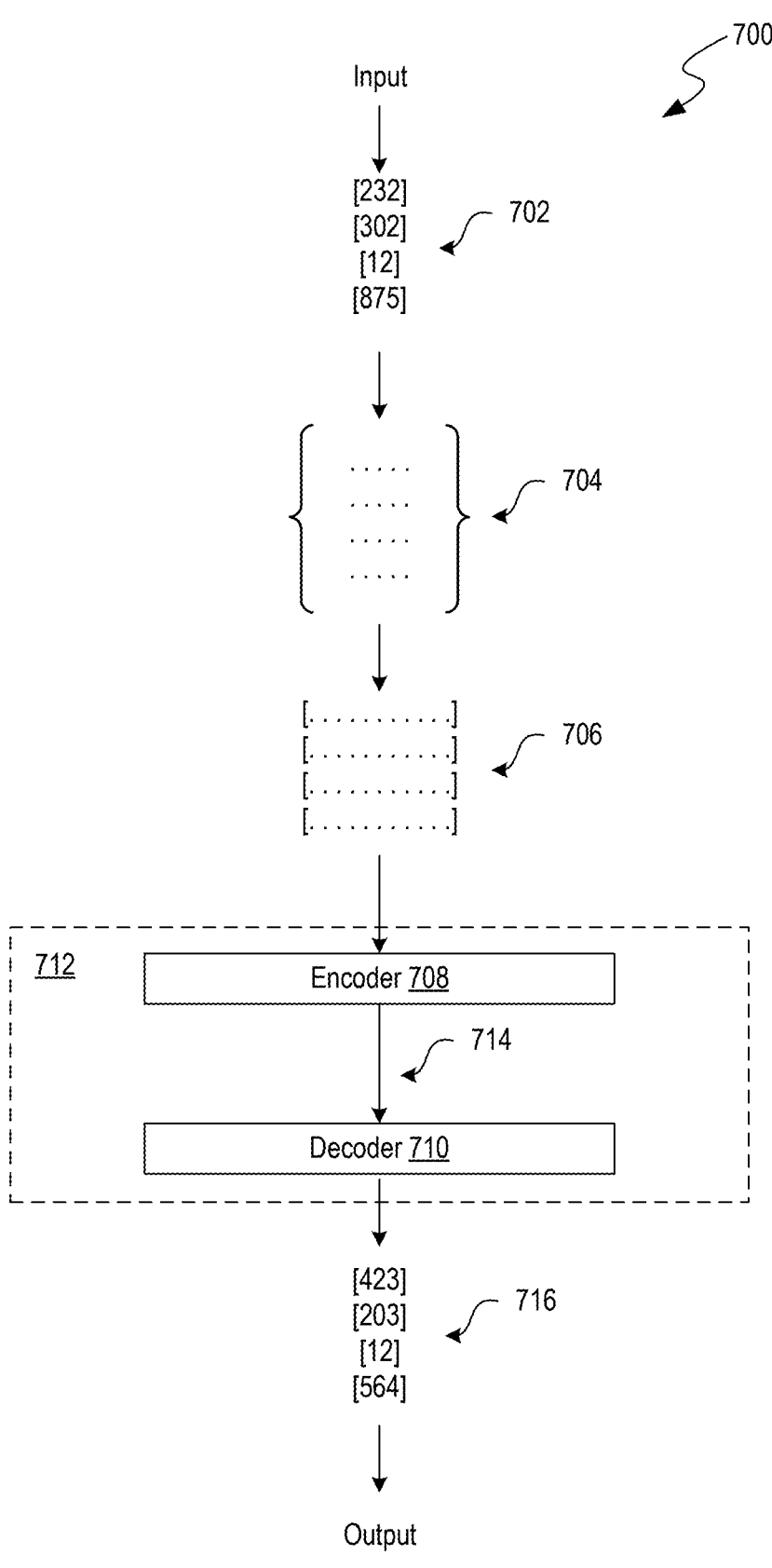
FIG. 7 is a block diagram of an example transformer.

FIG. 7 is a block diagram 700 of an example transformer 712. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any ML-based language model, including language models based on other neural network architectures such as RNN-based language models.

The transformer 712 includes an encoder 708 (which can comprise one or more encoder layers/blocks connected in series) and a decoder 710 (which can comprise one or more decoder layers/blocks connected in series). Generally, the encoder 708 and the decoder 710 each include a plurality of neural network layers, at least one of which can be a self-attention layer. The parameters of the neural network layers can be referred to as the parameters of the language model.

The transformer 712 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 712 is trained to perform certain functions on other input formats than natural language input. For example, the input can include objects, images, audio content, or video content, or a combination thereof.

The transformer 712 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 7 illustrates an example of how the transformer 712 can process textual input data. Input to a language model (whether transformer-based or otherwise) typically is in the form of natural language that can be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 7, a short sequence of tokens 702 corresponding to the input text is illustrated as input to the transformer 712. Tokenization of the text sequence into the tokens 702 can be performed by some pre-processing tokenization module such as, for example, a byte-pair encoding tokenizer (the "pre" referring to the tokenization occurring prior to the processing of the tokenized input by the LLM), which is not shown in FIG. 7 for simplicity. In general, the token sequence that is inputted to the transformer 712 can be of any length up to a maximum length defined based on the dimensions of the transformer 712. Each token 702 in the token sequence is converted into an embedding vector 706 (also referred to simply as an embedding 706). An embedding 706 is a learned numerical representation (such as, for example, a vector) of a token that captures some semantic meaning of the text segment represented by the token 702. The embedding 706 represents the text segment corresponding to the token 702 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 706 corresponding to the "write" token will be closer to another embedding corresponding to the "jot down" token in the vector space as compared to the distance between the embedding 706 corresponding to the "write" token and another embedding corresponding to the "summary" token.

The vector space can be defined by the dimensions and values of the embedding vectors. Various techniques can be used to convert a token 702 to an embedding 706. For example, another trained ML model can be used to convert the token 702 into an embedding 706. In particular, another trained ML model can be used to convert the token 702 into an embedding 706 in a way that encodes additional information into the embedding 706 (e.g., a trained ML model can encode positional information about the position of the token 702 in the text sequence into the embedding 706). In some examples, the numerical value of the token 702 can be used to look up the corresponding embedding in an embedding matrix 704 (which can be learned during training of the transformer 712).

The generated embeddings 706 are input into the encoder 708. The encoder 708 serves to encode the embeddings 706 into feature vectors 714 that represent the latent features of the embeddings 706. The encoder 708 can encode positional information (i.e., information about the sequence of the input) in the feature vectors 714. The feature vectors 714 can have very high dimensionality (e.g., on the order of thousands or tens of thousands), with each element in a feature vector 714 corresponding to a respective feature. The numerical weight of each element in a feature vector 714 represents the importance of the corresponding feature. The space of all possible feature vectors 714 that can be generated by the encoder 708 can be referred to as the latent space or feature space.

Conceptually, the decoder 710 is designed to map the features represented by the feature vectors 714 into meaningful output, which can depend on the task that was assigned to the transformer 712. For example, if the transformer 712 is used for a translation task, the decoder 710 can map the feature vectors 714 into text output in a target language different from the language of the original tokens 702. Generally, in a generative language model, the decoder 710 serves to decode the feature vectors 714 into a sequence of tokens. The decoder 710 can generate output tokens 716 one by one. Each output token 716 can be fed back as input to the decoder 710 in order to generate the next output token 716. By feeding back the generated output and applying self-attention, the decoder 710 is able to generate a sequence of output tokens 716 that has sequential meaning (e.g., the resulting output text sequence is understandable as a sentence and obeys grammatical rules). The decoder 710 can generate output tokens 716 until a special [EOT] token (indicating the end of the text) is generated. The resulting sequence of output tokens 716 can then be converted to a text sequence in post-processing. For example, each output token 716 can be an integer number that corresponds to a vocabulary index. By looking up the text segment using the vocabulary index, the text segment corresponding to each output token 716 can be retrieved, the text segments can be concatenated together, and the final output text sequence can be obtained.

In some examples, the input provided to the transformer 712 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an application programming interface (API)). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/ can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Artificial Intelligence System

Figure 8:
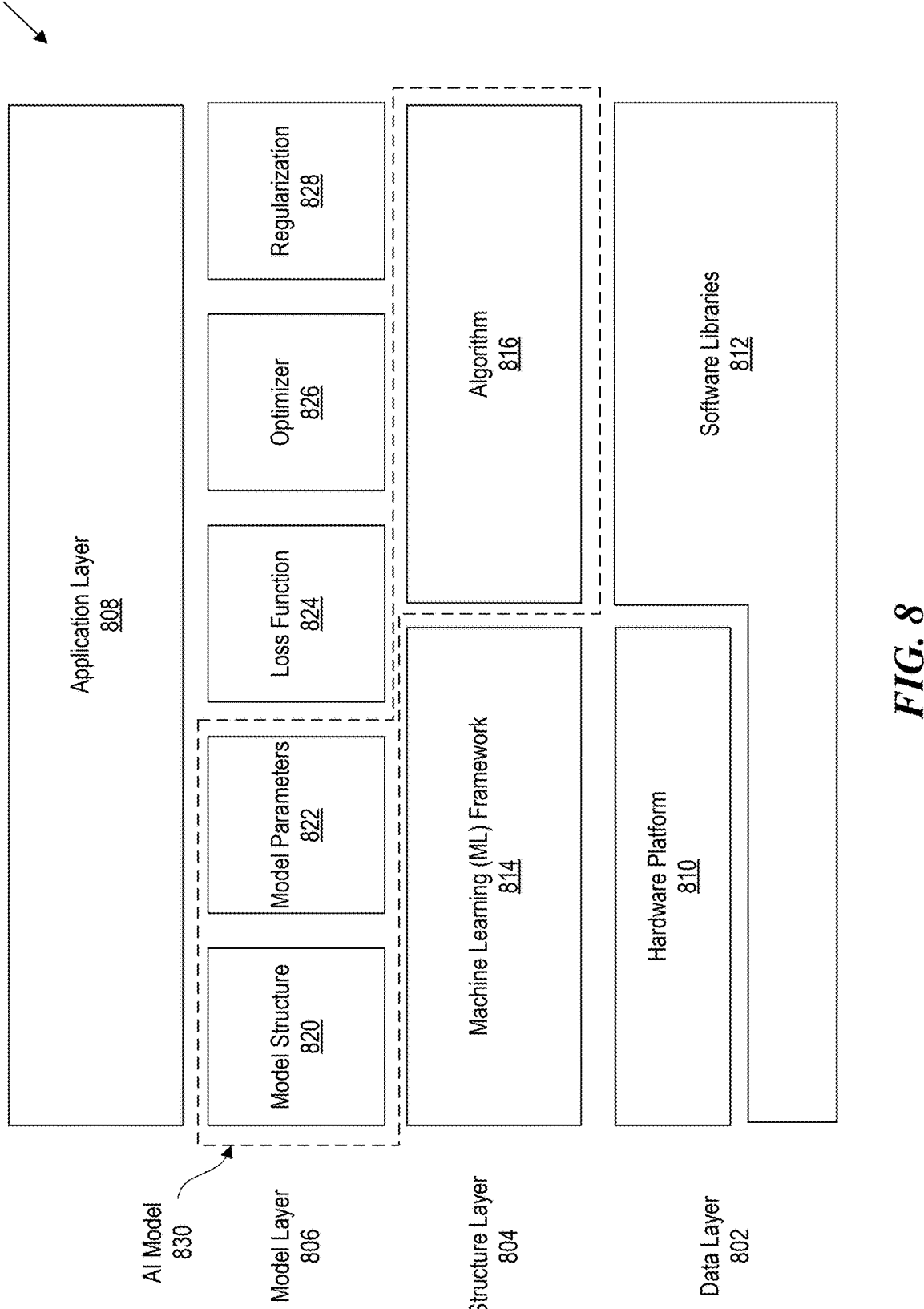
FIG. 8 is a block diagram that illustrates an example of an AI system in which at least some operations described herein can be implemented.

FIG. 8 is a block diagram that illustrates an example of an AI system 800 in which at least some operations described herein can be implemented. Example ML models can include the one or more AI models described in relation to FIGS. 1-5 above. Additionally, one or more components of the AI system 800 can be used in addition to or instead of the one or more AI models to perform the functions of the one or more AI models described therein.

As shown in FIG. 8, the AI system 800 can include a set of layers, which conceptually organize elements within an example network topology for the AI system's architecture to implement a particular AI model 830. Generally, an AI model 830 is a computer-executable program implemented by the AI system 800 that analyzes data to make predictions. Information can pass through each layer of the AI system 800 to generate outputs for the AI model 830. The layers can include a data layer 802, a structure layer 804, a model layer 806, and an application layer 808. The algorithm 816 of the structure layer 804 and the model structure 820 and model parameters 822 of the model layer 806 together form the example AI model 830. The optimizer 826, loss function engine 824, and regularization engine 828 work to refine and optimize the AI model 830, and the data layer 802 provides resources and support for application of the AI model 830 by the application layer 808.

The data layer 802 acts as the foundation of the AI system 800 by preparing data for the AI model 830. As shown, the data layer 802 can include two sub-layers: a hardware platform 810 and one or more software libraries 812. The hardware platform 810 can be designed to perform operations for the AI model 830 and include computing resources for storage, memory, logic, and networking. The hardware platform 810 can process amounts of data using one or more servers. The servers can perform backend operations such as matrix calculations, parallel calculations, ML training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O)

operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 810 can include Infrastructure as a Service (IaaS) resources, which are computing resources (e.g., servers, memory, etc.) offered by a cloud services provider. The hardware platform 810 can also include computer memory for storing data about the AI model 830, application of the AI model 830, and training data for the AI model 830. The computer memory can be a form of random-access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include Intel Math Kernel Library, Nvidia cuDNN, Eigen, and OpenBLAS.

The structure layer 804 can include an ML framework 814 and an algorithm 816. The ML framework 814 can be thought of as an interface, library, or tool that allows users to build and deploy the AI model 830. The ML framework 814 can include an open-source library, an API, a gradient-boosting library, an ensemble method, and/or a deep learning toolkit that work with the layers of the AI system to facilitate development of the AI model 830. For example, the ML framework 814 can distribute processes for application or training of the AI model 830 across multiple resources in the hardware platform 810. The ML framework 814 can also include a set of pre-built components that have the functionality to implement and train the AI model 830 and allow users to use pre-built functions and classes to construct and train the AI model 830. Thus, the ML framework 814 can be used to facilitate data engineering, development, hyperparameter tuning, testing, and training for the AI model 830. Examples of ML frameworks 814 that can be used in the AI system 800 include TensorFlow, PyTorch, Scikit-Learn, Keras, Caffe, LightGBM, Random Forest, and Amazon Web Services.

The algorithm 816 can be an organized set of computer-executable operations used to generate output data from a set of input data and can be described using pseudocode. The algorithm 816 can include complex code that allows the computing resources to learn from new input data and create new/modified outputs based on what was learned. In some implementations, the algorithm 816 can build the AI model 830 through being trained while running computing resources of the hardware platform 810. This training allows the algorithm 816 to make predictions or decisions without being explicitly programmed to do so. Once trained, the algorithm 816 can run at the computing resources as part of the AI model 830 to make predictions or decisions, improve computing resource performance, or perform tasks. The algorithm 816 can be trained using supervised learning, unsupervised learning, semi-supervised learning, and/or reinforcement learning.

Using supervised learning, the algorithm 816 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include asset tracking histories with known threat levels, resources with known relevancy scores measuring their relevance to known assets, and logs of physical and digital features with known correspondences and similarities. The user may label the training data based on one or more classes and train the AI model 830 by inputting the training data to the algorithm 816. The algorithm determines how to label the new data based on the labeled training data. The user can facilitate collection, labeling, and/or input via the ML framework 814. In some instances, the user may convert the training data to a set of feature vectors for input to the algorithm 816. Once trained, the user can test the algorithm 816 on new data to determine if the algorithm 816 is predicting accurate labels for the new data. For example, the user can use cross-validation methods to test the accuracy of the algorithm 816 and retrain the algorithm 816 on new training data if the results of the cross-validation are below an accuracy threshold.

Supervised learning can involve classification and/or regression. Classification techniques involve teaching the algorithm 816 to identify a category of new observations based on training data and are used when input data for the algorithm 816 is discrete. Said differently, when learning through classification techniques, the algorithm 816 receives training data labeled with categories (e.g., classes) and determines how features observed in the training data (e.g., service name, asset room location, asset internet protocol (IP) address) relate to the categories (e.g., high risk or low risk of cybersecurity attack). Once trained, the algorithm 816 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 816 is continuous. Regression techniques can be used to train the algorithm 816 to predict or forecast relationships between variables. To train the algorithm 816 using regression techniques, a user can select a regression method for estimating the parameters of the model. The user collects and labels training data that is input to the algorithm 816 such that the algorithm 816 is trained to understand the relationship between data features and the dependent variable(s). Once trained, the algorithm 816 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for ML-based pre-processing operations.

Under unsupervised learning, the algorithm 816 learns patterns from unlabeled training data. In particular, the algorithm 816 is trained to learn hidden patterns and insights of input data, which can be used for data exploration or for generating new data. Here, the algorithm 816 does not have a predefined output, unlike the labels output when the algorithm 816 is trained using supervised learning. Said another way, unsupervised learning is used to train the algorithm 816 to find an underlying structure of a set of data, group the data according to similarities, and represent that set of data in a compressed format. In some implementations, performance of the algorithm 816 that can use unsupervised learning is improved because it can learn how to fine-tune the model by setting an ideal cutoff score for relevancy rank, as described herein.

A few techniques can be used in supervised learning: clustering, anomaly detection, and techniques for learning latent variable models. Clustering techniques involve grouping data into different clusters that include similar data such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 816 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 816 may be trained to be an Isolation Forest, local outlier factor (LOF) algorithm, or k-NN algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 816 include factor analysis, item response theory, latent profile analysis, and latent class analysis.

The model layer 806 implements the AI model 830 using data from the data layer 802 and the algorithm 816 and ML framework 814 from the structure layer 804, thus enabling decision-making capabilities of the AI system 800. The model layer 806 includes a model structure 820, model parameters 822, a loss function engine 824, an optimizer 826, and a regularization engine 828.

The model structure 820 describes the architecture of the AI model 830 of the AI system 800. The model structure 820 defines the complexity of the pattern/relationship that the AI model 830 expresses. Examples of structures that can be used as the model structure 820 include decision trees, support vector machines, regression analyses, Bayesian networks, Gaussian processes, genetic algorithms, and neural networks. The model structure 820 can include a number of structure layers, a number of nodes (or neurons) at each structure layer, and activation functions of each node. Each node's activation function defines how the node converts data received to data output. The structure layers may include an input layer of nodes that receive input data and an output layer of nodes that produce output data. The model structure 820 may include one or more hidden layers of nodes between the input and output layers. The model structure 820 can be a neural network that connects the nodes in the structured layers such that the nodes are interconnected. Examples of neural networks include a transformer (e.g., the transformer 712, as described in relation to FIG. 7 above) or another neural network described above.

The model parameters 822 represent the relationships learned during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural networks such that the weights determine the strength of the nodes and the biases determine the thresholds for the activation functions of each node. The model parameters 822, in conjunction with the activation functions of the nodes, determine how input data is transformed into desired outputs. The model parameters 822 can be determined and/or altered during training of the algorithm 816.

The loss function engine 824 can determine a loss function, which is a metric used to evaluate the AI model's 830 performance during training. For instance, the loss function engine 824 can measure the difference between a predicted output of the AI model 830 and the actual output of the AI model 830 and is used to guide optimization of the AI model 830 during training to minimize the loss function. The loss function may be presented via the ML framework 814 such that a user can determine whether to retrain or otherwise alter the algorithm 816 if the loss function is over a threshold. In some instances, the algorithm 816 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model 830. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 826 used may be determined based on the type of model structure 820 and the size of data and the computing resources available in the data layer 802.

The regularization engine 828 executes regularization operations. Regularization is a technique that prevents overfitting and underfitting of the AI model 830. Overfitting occurs when the algorithm 816 is overly complex and too adapted to the training data, which can result in poor performance of the AI model 830. Underfitting occurs when the algorithm 816 is unable to recognize even basic patterns from the training data such that it cannot perform well on training data or on validation data. The regularization engine 828 can apply one or more regularization techniques to fit the algorithm 816 to the training data properly, which helps constrain the resulting AI model 830 and improves its ability for generalized application. Examples of regularization techniques include lasso (L1) regularization, ridge (L2) regularization, and elastic (L1 and L2) regularization.

The application layer 808 describes how the AI system 800 is used to solve problems or perform tasks. In an example implementation, the application layer 808 can include one or more components of the process deployment environment 100 as described in relation to FIG. 1 above.

Computer System

Figure 9:
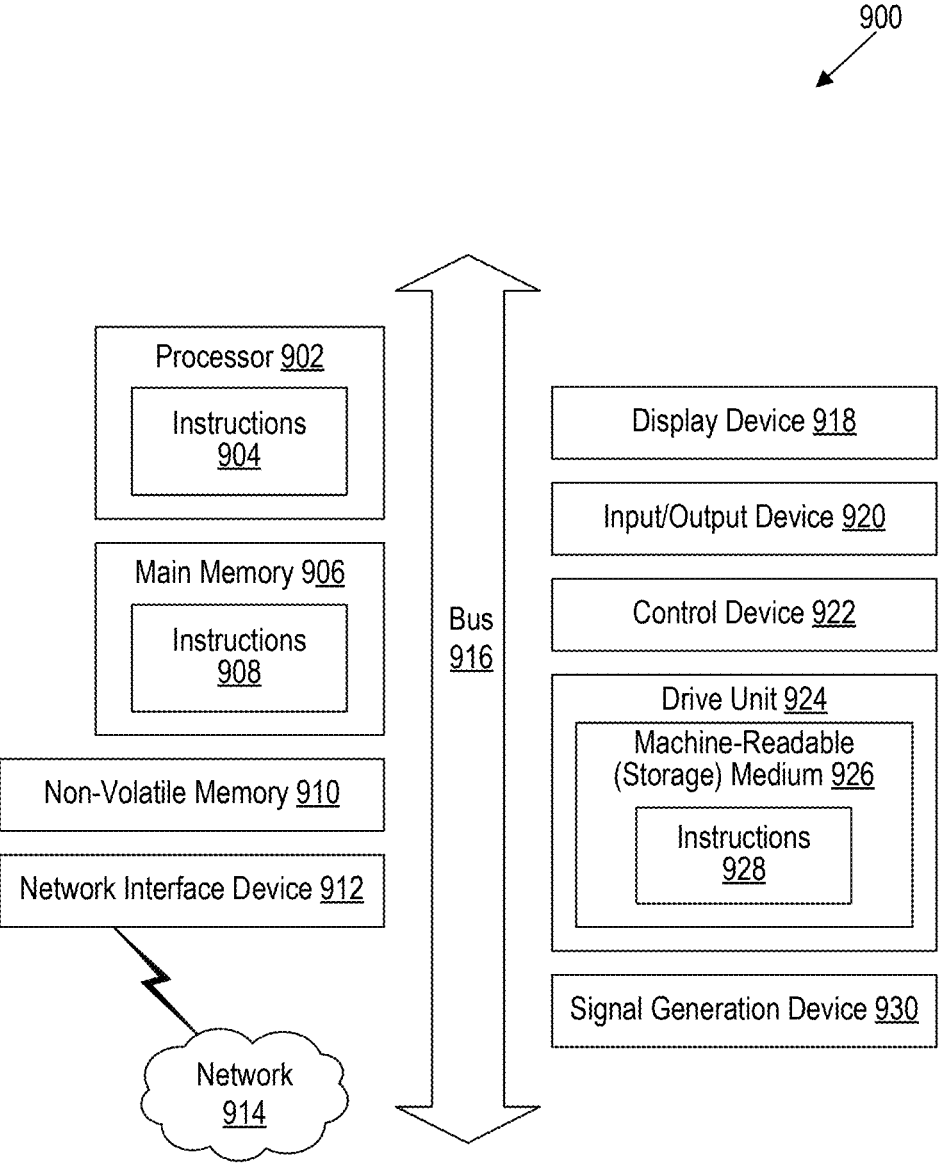
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an I/O device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), augmented reality (AR)/virtual reality (VR) systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer (SBC) system, or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable (storage) medium 926) can be local, remote, or distributed. Although shown as a single medium, the machine-readable (storage) medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable (storage) medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media comprising instructions recorded thereon, wherein the instructions, when executed by at least one data processor of a system, cause the system to:

obtain input data including at least a multi-part objective, a current process metric, technological context, and entity context;

provide the input data to a transformation decision engine that produces, as output, a transformation readiness evaluation for a first deterministic process by:

generating, using one or more artificial intelligence (AI) models, a first transformation value based on the current process metric;

generating, using the one or more AI models, a second transformation value based on the technological context and the entity context;

generating, using the one or more AI models, a third transformation value based on the entity context and the multi-part objective;

generating, using the one or more AI models, a fourth transformation value based on the multi-part objective; and calculating the transformation readiness evaluation based on the first transformation value, the second transformation value, the third transformation value, the fourth transformation value, and a set of evaluation weights;

in response to determining that the transformation readiness evaluation falls within a first predetermined range:

generate a first instruction to increment the first deterministic process before initiating a transformation based on the first deterministic process;

in response to determining that the transformation readiness evaluation falls within a second predetermined range:

generate a second instruction to transform a second deterministic process based on the first deterministic process after a predetermined time period has elapsed; and in response to determining that the transformation readiness evaluation falls within a third predetermined range:

generate a third instruction to transform the second deterministic process using the first deterministic process, wherein the third instruction includes a set of protocols for transforming the second deterministic process;

provide, as input, the third instruction to a compliance orchestrator that produces, as output, an authorization notification indicating whether to accept the third instruction by:

transmitting a transformation notification to one or more authorization entities, wherein the one or more authorization entities are identified by a policy engine;

receiving a set of responses from the one or more authorization entities;

comparing the set of protocols to a set of applicable compliance frameworks; and generating the authorization notification based on a result of the comparing and the set of responses;

in response to the authorization notification indicating the third instruction is accepted, initiate a parallel deployment of the first deterministic process and the second deterministic process, wherein the parallel deployment includes:

deploying a simulated version of the first deterministic process to generate a performance metric;

in response to the performance metric exceeding a first predetermined threshold, initiating a shadow deployment of the first deterministic process alongside the second deterministic process to generate an accuracy metric for the first deterministic process;

32 in response to the accuracy metric exceeding a second predetermined threshold, initiating a canary deployment of the first deterministic process, wherein the first deterministic process handles a percentage of production traffic for the second deterministic process, and wherein, during the canary deployment, the percentage increases upon satisfaction of a set of evaluation criteria; and upon the first deterministic process handling all the production traffic, initiating a replacement of the second deterministic process with the first deterministic process; and after completing the replacement of the second deterministic process with the first deterministic process, retraining the one or more AI models, based on a set of performance metrics associated with the first deterministic process, to identify patterns between transformations, transformation values, and evaluation weights.

2. The one or more non-transitory, computer-readable storage media of claim 1, further comprising instructions causing the system to:

based on comparing at least one metric from the set of performance metrics to at least one threshold from a set of error thresholds, determine a failure in deployment of the first deterministic process; and based on the determination:

create a checkpoint of an in-progress signal from the production traffic;

redirect all the production traffic to the second deterministic process; and record a system state associated with the first deterministic process to a failure pattern database.

3. The one or more non-transitory, computer-readable storage media of claim 1, further comprising instructions causing the system to:

generate, using the one or more AI models, an impact assessment associated with replacing the second deterministic process with the first deterministic process, wherein the transformation notification includes the impact assessment.

4. The one or more non-transitory, computer-readable storage media of claim 1, further comprising instructions causing the system to:

record an audit log including the authorization notification, the set of performance metrics, and a timestamp in an immutable database, wherein the immutable database is a blockchain or an append-only database.

5. The one or more non-transitory, computer-readable storage media of claim 1, further comprising instructions causing the system to:

determine, based on the set of applicable compliance frameworks, one or more compliance records to generate; and generate the one or more compliance records, each compliance record including a timestamp and a digital signature.

6. The one or more non-transitory, computer-readable storage media of claim 1, further comprising instructions causing the system to:

determine, using the one or more AI models, a sentiment associated with the first deterministic process;

based on the sentiment, update a transformation knowledge database, wherein the transformation knowledge database includes one or more comparisons of transformations having different types; and retrain, based on data from the transformation knowledge database, the one or more AI models.

7. A system comprising:

at least one hardware processor; and at least one non-transitory memory storing instructions, which, when executed by the at least one hardware processor, cause the system to:

obtain input data including at least a multi-part objective, a current process metric, technological context, and entity context;

provide the input data to a transformation decision engine that produces, as output, a transformation readiness evaluation for a first deterministic process;

in response to determining that the transformation readiness evaluation falls within a first predetermined range:

generate a first instruction to transform a second deterministic process based on the first deterministic process, wherein the first instruction includes a set of protocols for transforming the second deterministic process; and provide, as input, the first instruction to a compliance orchestrator that produces, as output, an authorization notification indicating whether to accept the first instruction; and in response to the authorization notification indicating the first instruction is accepted, initiate a parallel deployment of the first deterministic process and the second deterministic process, wherein the parallel deployment includes:

deploying a simulated version of the first deterministic process to generate a performance metric;

in response to the performance metric exceeding a first predetermined threshold, initiating a shadow deployment of the first deterministic process alongside the second deterministic process to generate an accuracy metric for the first deterministic process; and in response to the accuracy metric exceeding a predetermined threshold, initiating a canary deployment of the first deterministic process, wherein the first deterministic process handles a percentage of production traffic for the second deterministic process, and wherein, during the canary deployment, the percentage increases upon satisfaction of a set of evaluation criteria; and upon the first deterministic process handling all of the production traffic, initiating a replacement of the second deterministic process with the first deterministic process.

8. The system of claim 7, wherein the transformation decision engine generates the transformation readiness evaluation by:

generating, using one or more artificial intelligence (AI) models, a first transformation value based on the current process metric;

generating, using the one or more AI models, a second transformation value based on the technological context and the entity context;

generating, using the one or more AI models, a third transformation value based on the entity context and the multi-part objective;

generating, using the one or more AI models, a fourth transformation value based on the multi-part objective; and calculating the transformation readiness evaluation based on the first transformation value, the second transformation value, the third transformation value, the fourth transformation value, and a set of evaluation weights.

9. The system of claim 8, further comprising instructions causing the system to:

after completing the replacement of the second deterministic process with the first deterministic process, retrain the one or more AI models, based on a set of performance metrics associated with the first deterministic process, to identify patterns between transformations, transformation values, and evaluation weights.

10. The system of claim 7, further comprising instructions causing the system to:

in response to determining that the transformation readiness evaluation falls within a second predetermined range:

generate a second instruction to increment the first deterministic process before initiating a transformation based on the first deterministic process; and in response to determining that the transformation readiness evaluation falls within a third predetermined range:

generate a third instruction to transform the second deterministic process based on the first deterministic process after a predetermined time period has elapsed.

11. The system of claim 7, wherein the compliance orchestrator produces the authorization notification by:

transmitting a transformation notification to one or more authorization entities, wherein the one or more authorization entities are identified by a policy engine;

receiving a set of responses from the one or more authorization entities;

comparing the set of protocols to a set of applicable compliance frameworks; and generating the authorization notification based on a result of the comparing and the set of responses.

12. The system of claim 7, further comprising instructions causing the system to:

after completing the replacement of the second deterministic process with the first deterministic process, determine a set of performance metrics associated with the first deterministic process;

based on comparing at least one metric from the set of performance metrics to at least one threshold from a set of error thresholds, determine a failure in deployment of the first deterministic process; and based on the determination:

create a checkpoint of an in-progress signal from the production traffic;

redirect all the production traffic to the second deterministic process; and record a state of the system to a failure pattern database.

13. The system of claim 7, further comprising instructions causing the system to:

determine, using one or more AI models, a sentiment associated with the first deterministic process; and based on the sentiment, update a transformation knowledge database, wherein the transformation knowledge database includes one or more comparisons of transformations having different types.

14. A method comprising:

obtaining input data associated with deployment of a first deterministic process at a computing environment;

providing the input data to a transformation decision engine that produces, as output, a transformation readiness evaluation for the first deterministic process at the computing environment;

in response to determining that the transformation readiness evaluation falls within a first predetermined range, generating a first instruction set to transform a second deterministic process based on the first deterministic process, wherein the first instruction set includes a set of protocols for transforming the second deterministic process; and using the first instruction set, initiating a parallel deployment of the first deterministic process at the computing environment and the second deterministic process at the computing environment, wherein the parallel deployment includes:

initiating a shadow deployment of the first deterministic process alongside the second deterministic process to generate an accuracy metric for the first deterministic process;

in response to the accuracy metric exceeding a predetermined threshold, initiating a canary deployment of the first deterministic process at the computing environment, wherein the first deterministic process handles a percentage of production traffic for the second deterministic process, and wherein, during the canary deployment, the percentage increases upon satisfaction of a set of evaluation criteria; and upon the first deterministic process handling all of the production traffic, initiating a replacement of the second deterministic process with the first deterministic process.

15. The method of claim 14, wherein the input data includes at least a multi-part objective, a current process metric, technological context, and entity context, and wherein the transformation decision engine generates the transformation readiness evaluation by:

generating, using one or more artificial intelligence (AI) models, a first transformation value based on the current process metric;

generating, using the one or more AI models, a second transformation value based on the technological context and the entity context;

generating, using the one or more AI models, a third transformation value based on the entity context and the multi-part objective;

generating, using the one or more AI models, a fourth transformation value based on the multi-part objective; and calculating the transformation readiness evaluation based on the first transformation value, the second transformation value, the third transformation value, the fourth transformation value, and a set of evaluation weights.

16. The method of claim 15, further comprising:

after completing the replacement of the second deterministic process with the first deterministic process, retraining the one or more AI models, based on a set of performance metrics associated with the first deterministic process, to identify patterns between transformations, transformation values, and evaluation weights.

17. The method of claim 14, further comprising:

in response to determining that the transformation readiness evaluation falls within a second predetermined range:

generating a second instruction to increment the first deterministic process before initiating a transformation based on the first deterministic process; and in response to determining that the transformation readiness evaluation falls within a third predetermined range:

generating a third instruction to transform the second deterministic process based on the first deterministic process after a predetermined time period has elapsed.

18. The method of claim 14, further comprising:

providing, as input, the first instruction set to a compliance orchestrator that produces, as output, an authorization notification indicating whether to accept the first instruction set; and in response to the authorization notification indicating the first instruction set is accepted, initiating the parallel deployment of the first deterministic process and the second deterministic process.

19. The method of claim 18, wherein the compliance orchestrator produces the authorization notification by:

transmitting a transformation notification to one or more authorization entities, wherein the one or more authorization entities are identified by a policy engine;

receiving a set of responses from the one or more authorization entities;

comparing the set of protocols to a set of applicable compliance frameworks; and generating the authorization notification based on a result of the comparing and the set of responses.

20. The method of claim 14, further comprising:

deploying a simulated version of the first deterministic process to generate a performance metric; and in response to the performance metric exceeding a first predetermined threshold, initiating the shadow deployment of the first deterministic process alongside the second deterministic process.

* * * * *